(12) United States Patent
Reddy et al.

(10) Patent No.: US 9,126,841 B2
(45) Date of Patent: Sep. 8, 2015

(54) AMMONIA PLANT

(75) Inventors: Satish Reddy, Irvine, CA (US);
Mukund Bhakta, Cerritos, CA (US);
Jeffrey Scherffius, Aliso Viejo, CA (US)

(73) Assignee: FLUOR TECHNOLOGIES CORPORATION, Aliso Viejo, CA (US)

( * ) Notice: Subject to any disclaimer, the term of this patent is extended or adjusted under 35 U.S.C. 154(b) by 665 days.

(21) Appl. No.: 11/572,507

(22) PCT Filed: Jul. 28, 2005

(86) PCT No.: PCT/US2005/027029
§ 371 (c)(1),
(2), (4) Date: Nov. 12, 2007

(87) PCT Pub. No.: WO2006/015231
PCT Pub. Date: Feb. 9, 2006

(65) Prior Publication Data
US 2008/0170980 A1    Jul. 17, 2008

Related U.S. Application Data

(60) Provisional application No. 60/592,930, filed on Jul. 29, 2004.

(51) Int. Cl.
*C01C 1/04* (2006.01)
*C01B 3/02* (2006.01)
*F25J 3/02* (2006.01)

(52) U.S. Cl.
CPC ............... *C01C 1/0405* (2013.01); *C01B 3/025* (2013.01); *F25J 3/0219* (2013.01); *F25J 3/0276* (2013.01); *F25J 2200/02* (2013.01); *F25J 2200/74* (2013.01); *F25J 2200/80* (2013.01); *F25J 2210/20* (2013.01); *F25J 2230/20* (2013.01);
(Continued)

(58) Field of Classification Search
CPC . F25J 2230/20; F25J 2200/02; F25J 2200/74; F25J 2200/80; F25J 2240/02; F25J 2235/02; F25J 2210/20; F25J 3/0219; F25J 3/0276; C01C 1/0405; C01B 3/025
USPC .......................................... 423/359; 252/377
See application file for complete search history.

(56) References Cited

U.S. PATENT DOCUMENTS

| | | | |
|---|---|---|---|
| 3,442,613 A | 5/1969 | Grotz, Jr. | |
| 4,409,196 A | 10/1983 | Skinner et al. | |
| 4,636,334 A * | 1/1987 | Skinner et al. | 252/377 |

(Continued)

FOREIGN PATENT DOCUMENTS

| | | |
|---|---|---|
| EP | 0113530 | 7/1984 |
| WO | 9212927 | 8/1992 |

(Continued)

*Primary Examiner* — Jennifer A Smith
(74) *Attorney, Agent, or Firm* — Fish & Tsang, LLP

(57) ABSTRACT

A synthesis plant (309A) includes a compression device (360A) that increases a pressure differential between the bottom product pressure of a cryogenic separator (340A) and the delivery pressure of the bottom product to a downstream plant component. Such increased pressure differential is employed to increase cooling in the separator (340A) to thereby significantly reduce the volume of excess air. In most preferred aspects, at least part of the energy required for the compression device is provided by expansion (320A) of the separator feed.

19 Claims, 4 Drawing Sheets

(52) U.S. Cl.
CPC ........... *F25J 2235/02* (2013.01); *F25J 2240/02* (2013.01)

(56) References Cited

U.S. PATENT DOCUMENTS 4,780,298 A    10/1988  Kowal
5,510,094 A *   4/1996  Bhat et al. ................ 423/243.07
5,935,544 A     8/1999  Bhakta
6,494,054 B1 * 12/2002  Wong et al. ..................... 62/335
2002/0102200 A1 8/2002  Jungerhans

FOREIGN PATENT DOCUMENTS

WO          03/002459       1/2003
WO          2006/015231 A2  2/2006

* cited by examiner

AMMONIA PLANT

This application claims priority to our U.S. provisional patent application with the Ser. No. 60/592,930, which was filed Jul. 29, 2004.

FIELD OF THE INVENTION

The field of the invention is configurations and methods for ammonia production.

BACKGROUND OF THE INVENTION

In most conventional ammonia plants, natural gas is processed in primary and secondary reformers to generate hydrogen, and the reformed gas stream is then subjected to a shift conversion for additional hydrogen production after excess heat has been recovered from the reformed gas stream. In a still further step, acid gases (here: carbon dioxide) are removed and residual carbon monoxide (CO) and carbon dioxide ($CO_2$) are converted into methane in a downstream methanator. The resulting raw synthesis gas stream is then passed into the synthesis loop for production of ammonia, wherein the nitrogen is typically provided from process air that is fed into the secondary reformer.

Typically, an ammonia plant will use a stoichiometric amount of process air in the secondary reformer to maintain a hydrogen to nitrogen molar ratio of 3 to 1 in the methanator effluent gas (raw synthesis gas), which is typically the make-up gas to the ammonia synthesis loop. Where desirable, production capacity can be increased by introducing excess air and then by removing excess nitrogen from the syngas stream by combination of gas expansion, autorefrigeration, and cryogenic separation as for example described in U.S. Pat. No. 3,442,613 to Grotz. While Grotz's configuration is relatively effective in some ammonia production plants, retrofitting of existing plants is problematic since the expansion step requires considerable increase in front-end pressure in a ammonia synthesis plant and thereby typically necessitates retrofits/rebuilds to accommodate for the increased pressure.

To circumvent at least some of the problems associated with retrofitting existing ammonia synthesis production plants, Bhakta describes in U.S. Pat. No. 5,935,544 a configuration in which a purifier process has been applied to a low methane content syngas with moderate $N_2$ excess, wherein an external refrigeration step produces a syngas with sufficiently low inert content to significantly increase synthesis capacity or decrease in synthesis loop pressure. Although Bhakta's configuration overcomes in many cases the need for retrofitting existing plants, Bhakta's configuration is typically limited to relatively narrow process parameters in order to provide satisfactory improvements in synthesis capacity.

In yet other known plant configurations (see e.g., our commonly owned International patent application with publication number WO 03/002459), an ammonia plant includes a separation system upstream of a synthesis loop that removes excess nitrogen and other gaseous compounds from a feed gas having a ratio of hydrogen to nitrogen of less than 3:1 to thereby produce a syngas with a ratio of hydrogen to nitrogen at about 3:1. In particularly preferred systems, a coldbox with a refrigerant other than air, or pressure swing adsorption unit operates as the separation system. While such configurations provide numerous advantages over previously known ammonia plants, demands for excess air are still relatively high.

Therefore, despite numerous known configurations and processes for improvements of ammonia synthesis, all or almost all of them suffer from one or more disadvantages. Thus, there is still a need to provide improved methods and configurations for ammonia synthesis.

SUMMARY OF THE INVENTION

The present invention is generally directed towards configurations and methods of an ammonia synthesis plant in which separator refrigeration is increased by increasing a pressure differential in the separator bottom product.

In one aspect of the inventive subject matter, an ammonia plant includes a cryogenic separator that is configured to receive a raw syngas and to produce a bottom product and a processed syngas overhead product. An expansion device is further coupled to the cryogenic separator and is configured to provide refrigeration cold to the cryogenic separator by expanding the bottom product from a first pressure to a second pressure. Contemplated plants still further include a compression device that is fluidly coupled to the separator such that the compression device increases a pressure differential between the first and second pressure that is usable to increase the refrigeration cold.

Most preferably, a raw syngas expander is coupled to the cryogenic separator, wherein the raw syngas expander is configured to provide expanded raw syngas to the cryogenic separator, and wherein the compression device is coupled to the raw syngas expander to thereby provide at least part of a compression energy. Where the expansion device is located upstream of the compression device, it is generally preferred that the expansion device is configured to expand the bottom product to a pressure between atmospheric pressure and 30 psig (e.g., JT valve). On the other hand, where the expansion device is located downstream of the compression device, it is generally preferred that the compression device is a pump that increases the first pressure up to 50 psig.

Thus, the inventors also contemplate a method of operating an ammonia plant in which in one step raw syngas is separated in a cryogenic separator into a bottom product and a processed syngas overhead product. In another step, refrigeration cold is provided to the cryogenic separator by expanding the bottom product from a first pressure to a second pressure, and in yet another step, the bottom product is compressed or pumped to increase a pressure differential between the first and second pressure to thereby increase generation of the refrigeration cold.

Viewed from another perspective, the inventors contemplate a method of operating an ammonia plant in which in one step raw syngas is expanded in an expander to produce work and refrigeration for cryogenic separation of the raw syngas into a bottom product and a processed syngas overhead product. Most preferably, the work is used to increase a pressure differential between a pressure of the bottom product of a cryogenic separator and a delivery pressure of the bottom product to a plant component downstream of the cryogenic separator.

Various objects, features, aspects and advantages of the present invention will become more apparent from the following detailed description of preferred embodiments of the invention.

DETAILED DESCRIPTION

The inventors have discovered that the amount of excess air in ammonia plants can be substantially reduced by increasing refrigeration in the coldbox rectifier. In most preferred configurations, the refrigeration is increased by increasing a pressure gradient in the rectifier bottom product, which is expanded to thereby generate refrigeration cold. Thus, contemplated configurations will advantageously reduce excess air rate (e.g., 37% versus 50% for the standard Braun process), which will also result in a lower hydraulic load in the front end of the plant and/or a lower $CO_2$ removal system duty.

For example, in one aspect of the inventive subject matter, the bottom product is over-expanded (i.e., expanded to a pressure below a delivery pressure to a downstream device) and then re-compressed using energy provided by raw syngas expansion. Alternatively, bottom product may also be pumped to a desired pressure using energy provided by raw syngas expansion, and the so pressurized bottom product is then expanded (or over-expanded and recompressed) to provide refrigeration. In preferred configurations, excess air and/or nitrogen can be introduced to the front-end of the syngas production process to improve capacity in contemplated configurations, while maintaining the stoichiometric ratio of hydrogen to nitrogen at about 3:1. The term "a molar ratio of hydrogen to nitrogen of about 3" as used herein refers to molar ratios of between 2.95 to 3.05, and more preferably between 2.97 to 3.03, and most preferably between 2.99 to 3.01. Moreover, it should be appreciated that contemplated configurations may be operated using relatively wide process parameters while improving productivity and/or reducing energy requirements.

Figure 1:
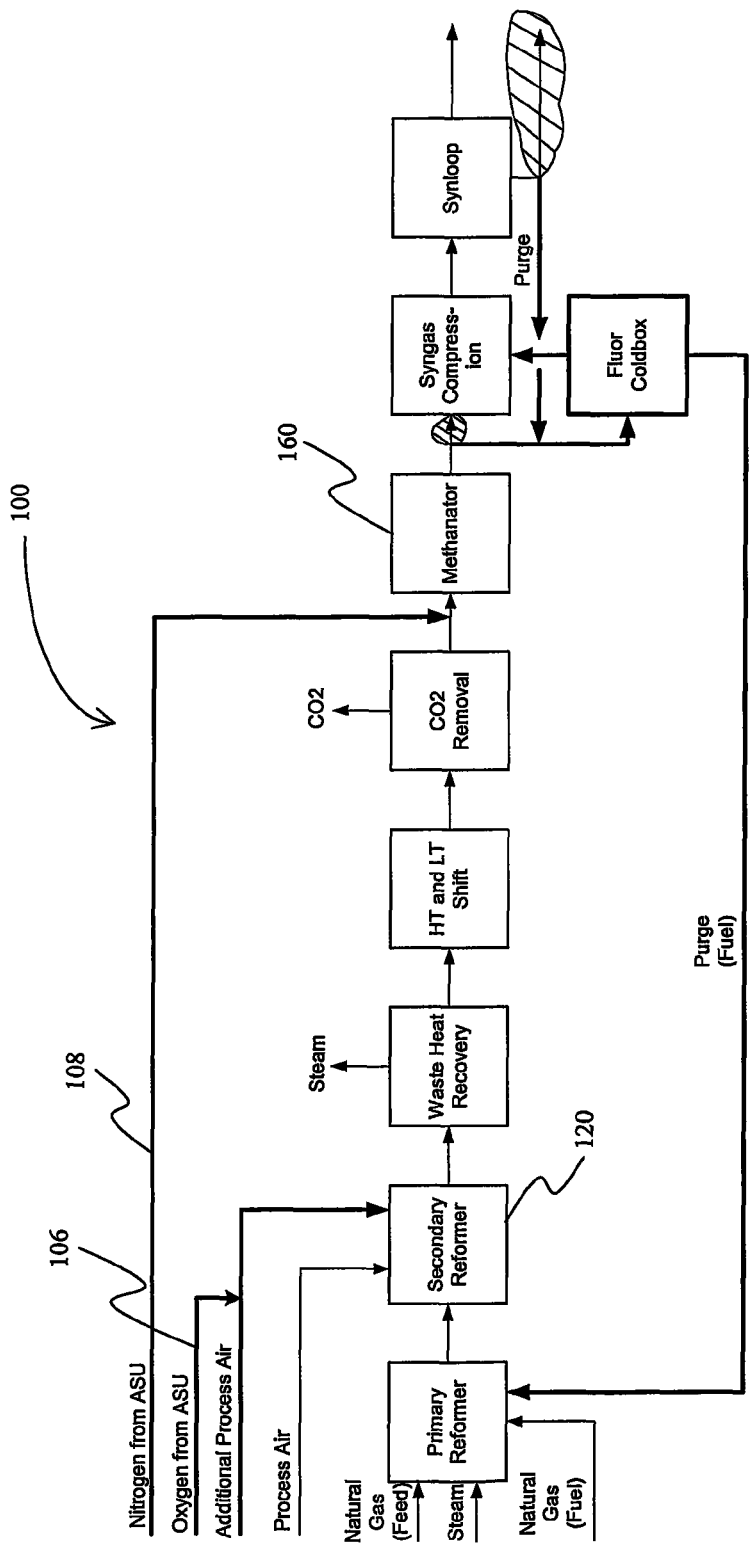
FIG. 1 is a prior art schematic of a known configuration for an ammonia plant.

An exemplary configuration of a known ammonia synthesis plants is depicted in Prior Art FIG. 1. Here, ammonia production in plant 100 is improved using an air separation unit. In such configurations, oxygen-rich gas 106 (i.e., comprising at least 25 mol %, more typically at least 75 mol %, and most typically at least 90 mol % oxygen) may be provided to the secondary reformer 120, and a nitrogen rich gas 108 (i.e., comprising at least 80 mol %, more typically at least 90 mol %, and most typically at least 95 mol % nitrogen) may be introduced to the reformed and/or shift converted gas at a position upstream of the methanator 160. Alternatively, the air separation unit may be omitted where desired or addition of an air separation unit would not be economically practicable. With respect to various process configurations and operating considerations of such plants, the same considerations apply as set forth in our International patent application having publication number WO 03/002459, which is incorporated by reference herein.

The inventors have now found out that the efficiency of the above and other ammonia plants can even further be improved by expanding the separator (rectifier) bottoms liquid to a pressure that is substantially lower than currently practiced and/or from a pressure that is substantially higher than currently practiced. It should be appreciated that use of such increased pressure differential alleviates the temperature pinch in the overhead condenser and the feed/effluent exchangers in the coldbox upstream of the rectifier. Therefore, and depending on the degree of rectifier bottoms liquid expansion, operation of the stoichiometric correction unit can be achieved with an excess air rate of less than 50%, more typically less than 40%, even more typically less than 30%, and most typically with an excess air rate of between about 20% to 30% (in some cases even less than 20%).

In most of the preferred configurations according to the inventive subject matter, the pressure differential used for refrigeration will be at least 10-20 psi, more typically at least 20-30 psi, and most typically between 25-50 psi across the expander. For example, the bottom product may now be expanded to atmospheric pressure (or slightly above) and is subsequently recompressed using power provided by the raw syngas expander. Such expansion typically will provide a pressure differential of about 15-25 psi, and more typically about 30 psi. The term "about" as used herein in conjunction with a numeral refers to a range of that numeral starting from 10% below the absolute of the numeral to 10% above the absolute of the numeral, inclusive. Similarly, a pump may be provided that increases the bottom product pressure from the rectifier pressure to an increased pressure that is between 20-40 psi higher, and more typically between 30-50 psi (or even higher).

Figure 2:
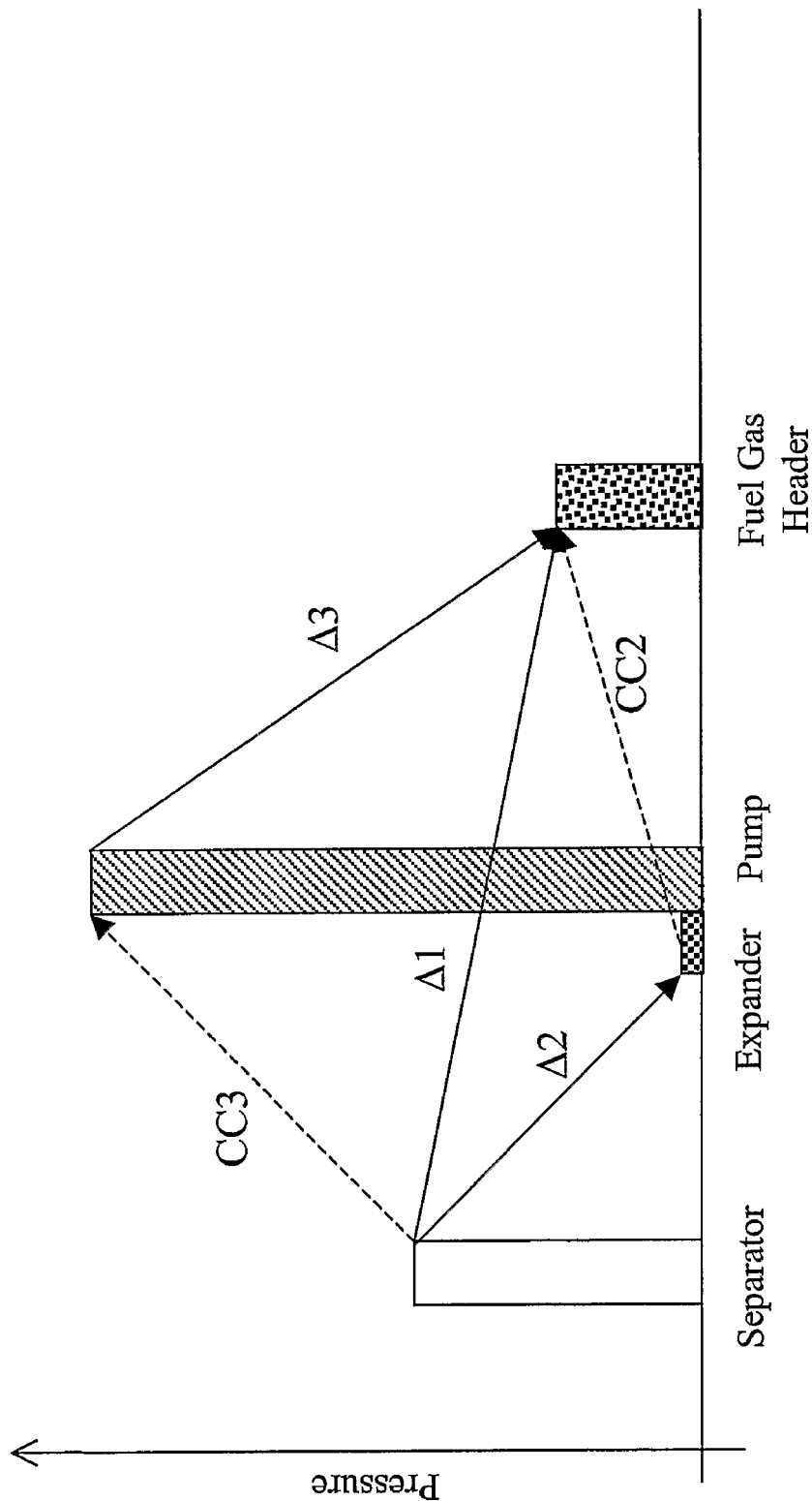
FIG. 2 is a graph illustrating pressure gradients of contemplated plants as compared to previously known plant configurations.

In contrast, heretofore known coldbox configurations were limited in their bottoms liquid expansion to an elevated pressure, typically corresponding to the fuel header pressure, which lead to a loss in refrigeration as compared to the configurations and methods according to the inventive subject matter. Moreover, most known coldbox configurations employ the energy from the expander for recompression of the syngas, which contributes only to a relatively small amount in the energy savings. FIG. 2 schematically illustrates the increase in pressure differential using contemplated configurations and methods. Here, with reference to a conventional ammonia plant, the pressure differential Δ1 between the separator bottom product pressure and a downstream device receiving the bottom product (typically the fuel header) has a first value. In configurations in which the bottoms product is over-expanded to a pressure at or near atmospheric pressure, pressure differential Δ2 between the separator bottom product pressure and the expander has a second value that is substantially greater than the first value. Energy expended to recompress over-expanded bottom product to the downstream device receiving the bottom product (shown in hatched line CC2) is preferably provided by the raw syngas expander. Similarly, in configurations in which the bottoms product is first pressurized (e.g., with a pump) to an increased pressure and then expanded, pressure differential Δ3 between the pump and the expander has a third value that is substantially greater than the first value. Energy expended to pressurize the bottom product (shown in hatched line CC3) is preferably provided by the raw syngas expander.

Figure 3A:
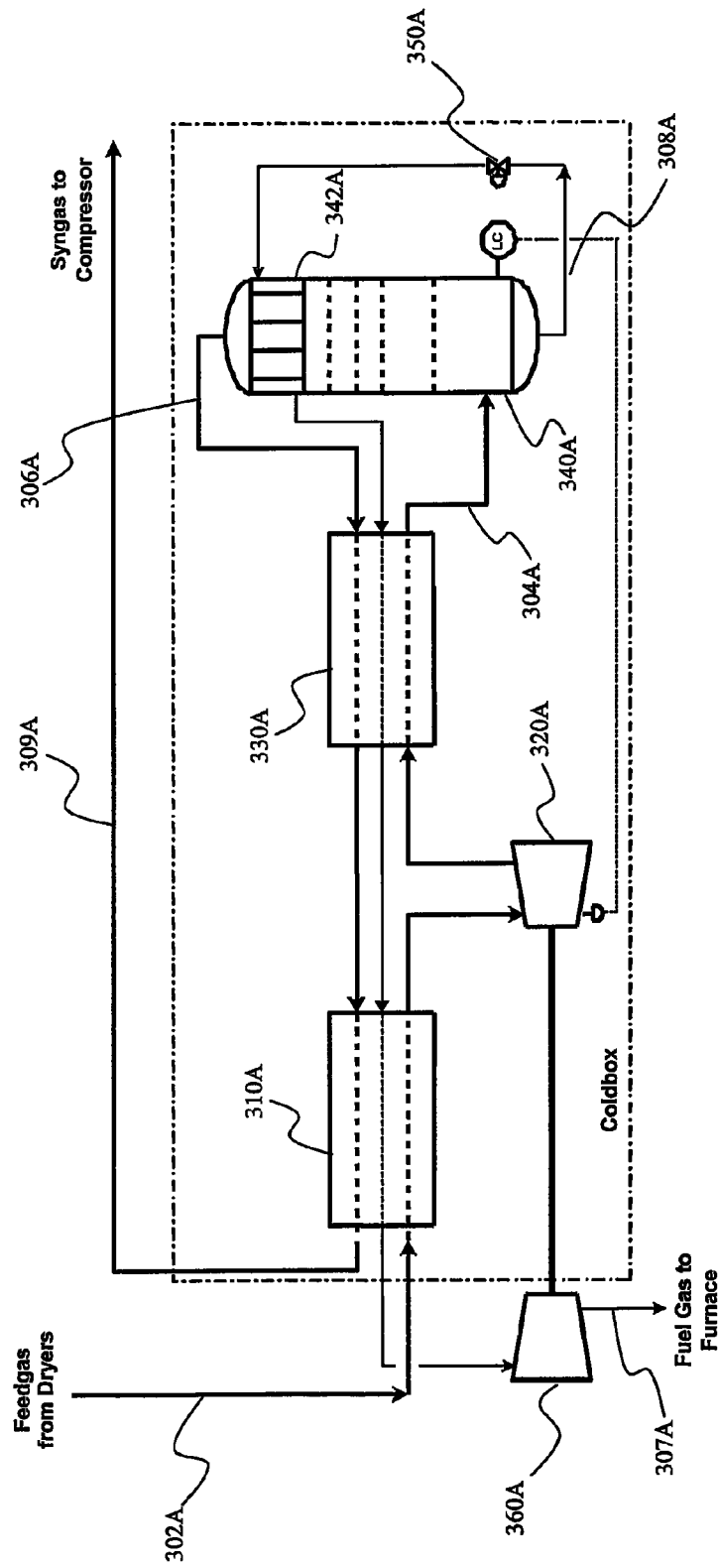
FIG. 3A is an exemplary configuration of one ammonia plant in which the bottom product is over-expanded and recompressed to fuel header pressure.

One exemplary configuration with over-expansion and recompression is depicted in FIG. 3A, which illustrates a detail view of a coldbox configuration (schematically shown in hatched lines). Here, feed gas 302A from feed gas dryers (not shown) is cooled in a first heat exchanger 310A, expanded in an expander 320A, and further cooled in a second heat exchanger 330A. The so expanded and cooled feed 304A is then separated in rectifier 340A into a vapor portion 306A and a liquid portion 308A. The liquid portion 308A is expanded in JT valve 350A to or near atmospheric pressure to provide refrigeration in the overhead condenser 342A. After providing refrigeration to the overhead condenser, the expanded product is then routed to the second and first heat exchangers 330A and 310A, respectively, before recompression in compressor 360A that is coupled to the expander. The recompressed gas 307A is then used as fuel in a furnace (not shown) or other downstream device. Similarly, the vapor phase (i.e., the syngas) 306A from the rectifier 340A is routed to the second and first heat exchangers 330A and 310A, respectively, to provide refrigeration. Heated syngas 309A typically has a hydrogen to nitrogen ratio of 3:1 and is then compressed by a syngas compressor (not shown).

Figure 3B:
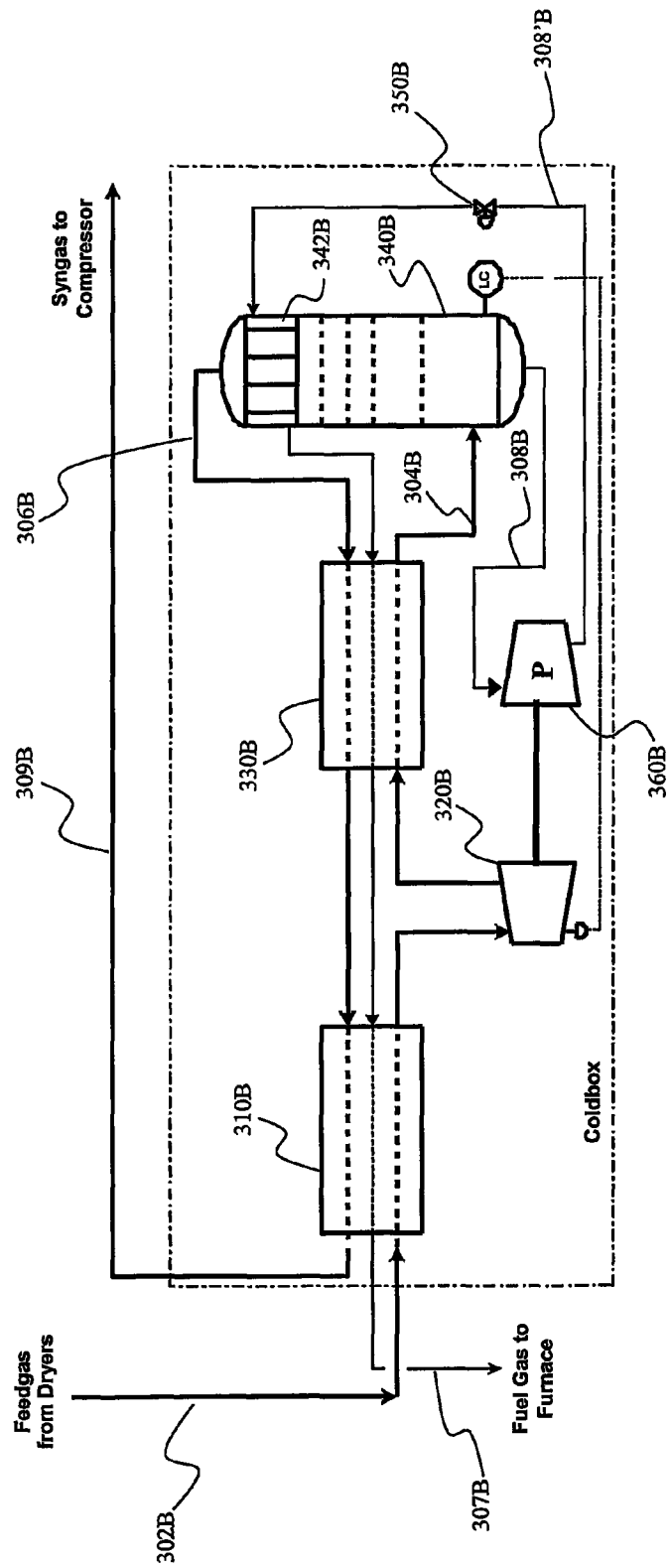
FIG. 3B an exemplary configuration of one ammonia plant in which the bottom product is pumped to an increased pressure and expanded to fuel header pressure.

In another configuration, as schematically depicted in FIG. 3B, the bottom product is first pumped to a desired pressure above rectifier pressure and then expanded to the pressure of a downstream device receiving the bottom product. Here, feed gas 302B from feed gas dryers (not shown) is cooled in a first heat exchanger 310B, expanded in expander 320B, and further cooled in a second heat exchanger 330B. The so expanded and cooled feed 304B is then separated in rectifier 340B into a vapor portion 306B and a liquid portion 308B. The liquid portion 308B is pressurized in pump 360B to a pressure above rectifier pressure (e.g., 30-50 psi above rectifier pressure) to form pressurized bottom product 308'B, and then expanded in JT valve 350B to provide refrigeration in the overhead condenser 342B. After providing refrigeration to the overhead condenser, the expanded product is then routed to the second and first heat exchangers 330B and 310B, respectively, before entering a downstream device (e.g., furnace) as stream 307B. Similarly, the vapor phase (i.e., the syngas) 306B from rectifier 340B is routed to the second and first heat exchangers 330B and 310B, respectively, to provide refrigeration. Heated syngas 309B typically has a hydrogen to nitrogen ratio of 3:1, and is then compressed by a syngas compressor (not shown).

It should be appreciated that the over-expansion of the rectifier bottoms liquid will result in a pressure that is typically between a pressure below the fuel header pressure and atmospheric pressure (and in some cases even below atmospheric pressure. Such expansion of the rectifier bottoms will generally not provide low pressure waste gas (e.g., fuel gas). Thus, it is preferred that the expanded gas exiting the coldbox exchangers will typically be recompressed to a desired pressure (e.g., about 15 psig for fuel gas), where recompression is required. In such cases, it is generally preferred that recompression is coupled with the process expander in the coldbox. Therefore, it should be recognized that no additional power for recompression is required. Moreover, in most cases cooling water will not be required as there are no intercoolers or aftercoolers included. Additionally, or alternatively, it should be appreciated that the work provided by the expander may also be employed for a pump that pressurizes the rectifier bottom liquid. In such configurations, cooling for the pressurized liquid may be provided using part of the refrigeration content of the expanded gas. The pressurized liquid may then be expanded to fuel gas header pressure or below as discussed above to provide an even higher refrigeration content. It should be appreciated that contemplated configurations may be installed de novo, or as an upgrade to an existing plant.

With respect to suitable pressure differentials, and especially those that are employed to provide refrigeration to the separator, it should be noted that all pressure differentials are deemed appropriate. Thus, contemplated pressure differentials include those between 1-100 psi (or even higher), more typically between 1-50 psi, and most typically between 10-50 psi. Therefore, contemplated compression devices for bottom products of the rectifier will include pumps that can increase the pressure of the bottom product in an amount of at least 10 psi, more typically at least 50 psi, and most typically at least 100 psi. Such devices may employ any energy available in the ammonia plant. However, it is especially preferred that the pump will be operationally coupled to the raw syngas expander. For example, suitable operational coupling includes mechanical coupling and electric coupling (e.g., expander drives generator that provides electric power to pump).

Similarly, the compression device may also be a compressor that recompresses expanded bottom product, wherein the compressor is operationally coupled to the raw syngas expander. Where the compression device is a compressor that recompresses previously expanded bottom product, it is generally contemplated that the compressor increases the previously expanded bottom from atmospheric pressure or a pressure above atmospheric pressure to a pressure that is suitable for a downstream device that receives the recompressed bottom product. For example, where the downstream device is a fuel gas header of a combustor, the compressor may increase the pressure up to between about 5-30 psig. With respect to contemplated expansion devices, it should be appreciated that all expansion devices are deemed suitable for use herein. However, it is typically preferred that the expansion device is a Joule-Thompson (JT) valve to provide refrigeration to the separator condenser. Alternative, the expansion device may also be used to generate power or to provide motive or compressive force to a fluid in the plant.

Thus, specific embodiments and applications of ammonia plant configurations and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. An ammonia plant comprising:
   a raw syngas expander that is configured to receive and expand a raw syngas;
   a cryogenic rectifier that is configured to receive the expanded raw syngas and to produce a bottom product at a bottom product pressure and to further produce a processed syngas overhead product;
   an expansion device that is fluidly coupled to the cryogenic rectifier and that is configured to receive the bottom product at a first pressure and to expand the bottom product from the first pressure to a second pressure to thereby provide refrigeration cold to an overhead condenser of the cryogenic rectifier; and
   (a) a compressor downstream of the expansion device and fluidly coupled to the expansion device to receive expanded bottom product when the first pressure is the bottom product pressure, such that the bottom product of the cryogenic rectifier flows directly from the rectifier to the expansion device and directly from the expansion device to the compressor that compresses the expanded bottom product from the second pressure to a higher pressure, or (b) a pump upstream of the expansion device and fluidly coupled to the expansion device to receive the bottom product when the pump compresses the bottom product from the bottom product pressure to the first pressure, such that the bottom product of the cryogenic rectifier flows directly from the rectifier to the pump and directly from the pump to the expansion device; and wherein the pump or compressor is operationally coupled to the raw syngas expander such that energy expended in the pump or compressor is produced by the raw syngas expander, and wherein a pressure differential between the first and second pressure is sufficient to increase the refrigeration cold in the overhead condenser.

2. The ammonia plant of claim 1 further comprising a raw syngas expander coupled to the cryogenic rectifier, wherein the raw syngas expander is configured to provide expanded raw syngas to the cryogenic rectifier.

3. The ammonia plant of claim 2 wherein the pump or compressor is coupled to the raw syngas expander to thereby provide at least part of a compression energy.

4. The ammonia plant of claim 3 wherein the expansion device is located upstream of the compressor.

5. The ammonia plant of claim 4 wherein the expansion device is configured to expand the bottom product to a pressure between atmospheric pressure and 30 psig.

6. The ammonia plant of claim 3 wherein the expansion device comprises a JT valve.

7. The ammonia plant of claim 3 wherein the expansion device is located downstream of the pump.

8. The ammonia plant of claim 7 wherein the pump increases the bottom pressure by an amount of 30 to 50 psi.

9. A method of operating an ammonia plant, comprising:
expanding a raw syngas in a raw syngas expander to form an expanded raw syngas and to produce energy;
separating the expanded raw syngas in a cryogenic rectifier into a bottom product having a bottom product pressure and a processed syngas overhead product;
expanding in an expander the entire bottom product from a first pressure to a second pressure to thereby provide refrigeration cold to an overhead condenser of the cryogenic rectifier; and
compressing in a compressor the entire bottom product from the bottom product pressure to the first pressure such that the entire bottom product flows directly from the cryogenic rectifier to the compressor and from the compressor to the expander, or
compressing in a compressor the entire bottom product from the second pressure to a higher pressure when the bottom product pressure is the first pressure such that the entire bottom product flows directly from the cryogenic rectifier to the expander and from the expander to the compressor;
wherein energy required for the step of compressing the entire bottom product is provided by the expansion of the raw syngas in the raw syngas expander; and wherein an increase in a pressure differential between the first and second pressure is sufficient to increase generation of the refrigeration cold in the overhead condenser.

10. The method of claim 9 wherein the expander is a JT valve.

11. The method of claim 10 wherein the raw syngas expander is operationally coupled to the compressor that compresses the bottom product.

12. The method of claim 9 wherein the bottom product is expanded from the bottom product pressure to a pressure that is between atmospheric pressure and 30 psig.

13. The method of claim 12 wherein the higher pressure is a pressure suitable for feeding to a reformer furnace.

14. The method of claim 9 wherein the bottom product is pumped to the first pressure and then expanded to the second pressure, wherein the first pressure is higher than an operating pressure of the cryogenic rectifier.

15. A method of operating an ammonia plant, comprising:
expanding raw syngas in an expander to produce work and refrigeration for cryogenic separation of the raw syngas into a bottom product and a processed syngas overhead product;
operationally coupling the expander to (i) a compressor that is located downstream of an expansion device and compresses expanded bottom product to a delivery pressure or (ii) a pump that is located upstream of the expansion device;
using the work from the expander to drive the pump or compressor that compresses the bottom product to thereby allow for an increase in a pressure differential between a pressure of the bottom product of a cryogenic rectifier and the delivery pressure of the bottom product to a plant component downstream of the cryogenic rectifier; and
wherein the increased pressure differential is used to generate refrigeration duty for an overhead condenser of the cryogenic rectifier.

16. The method of claim 15 wherein the step of using the work comprises compressing the bottom product using the pump to increase the pressure, wherein the pump is located upstream of an expansion device that expands the pumped bottom product to the delivery pressure.

17. The method of claim 16 wherein the pump increases the pressure by an amount of 30 to 50 psi.

18. The method of claim 15 wherein the compressor is downstream of the expansion device and wherein the expansion device reduces the pressure of the bottom product to a pressure between atmospheric pressure and 30 psig.

19. The method of claim 18 wherein the expanded bottom product further provides refrigeration in at least one heat exchanger.

* * * * *